(No Model.)
P. C. FREESE.
WIRE FENCE.
No. 383,804.  Patented May 29, 1888.
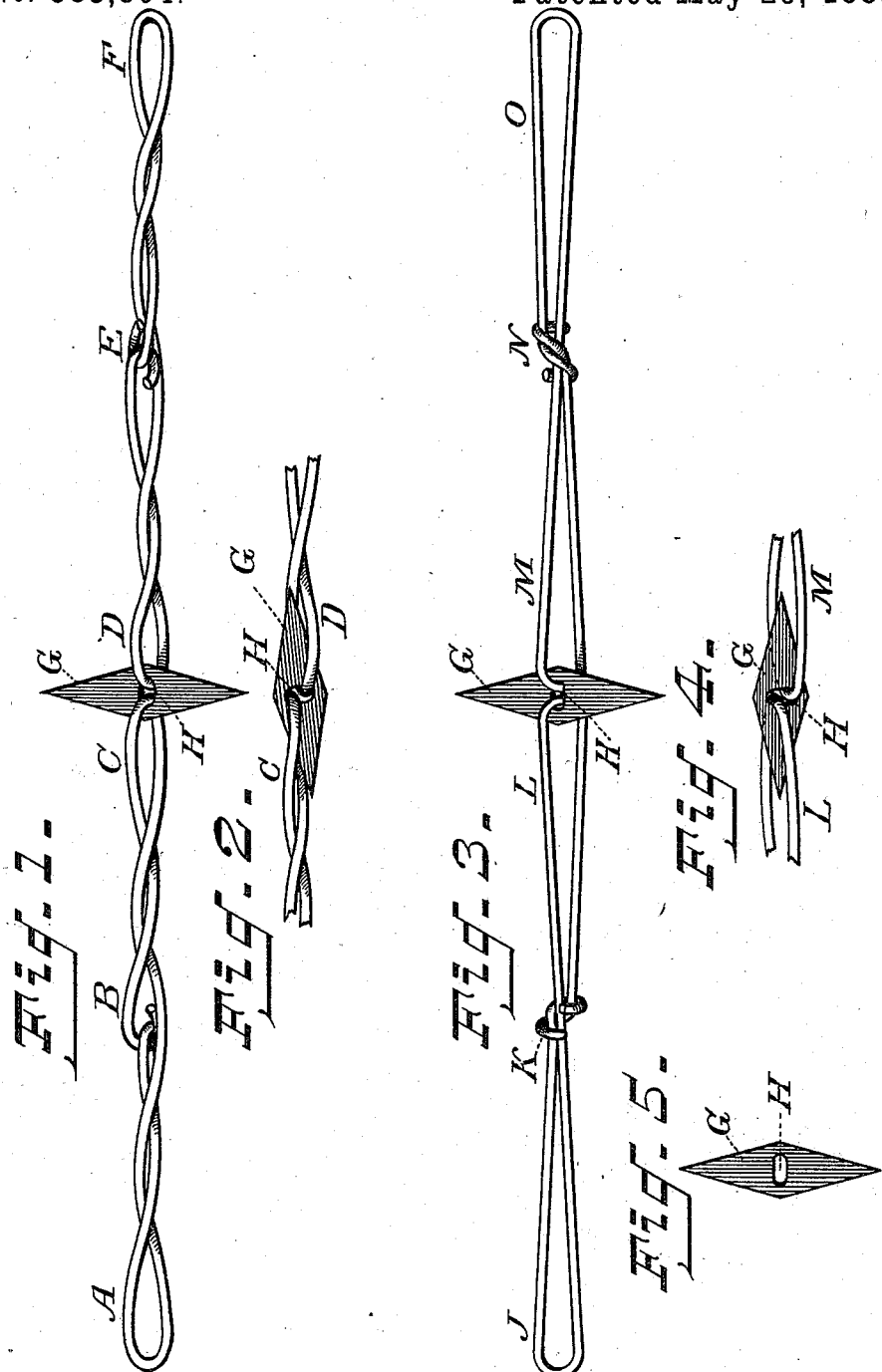
Witnesses:
George Underwood
George SO Wells
Inventor:
Peter C. Freese,
By Attorney.
Frederick I. Allen

UNITED STATES PATENT OFFICE.

PETER C. FREESE, OF CAYUGA, NEW YORK.

WIRE FENCE.

SPECIFICATION forming part of Letters Patent No. 383,804, dated May 29, 1888.

Application filed January 3, 1888. Serial No. 259,553. (No model.)

*To all whom it may concern:*

Be it known that I, PETER C. FREESE, of the village of Cayuga, Cayuga county, New York, have invented certain new and useful Improvements in Wire Fences, of which the following is a description, reference being had to the accompanying drawings, in which my invention is illustrated.

My invention relates to that class of wire fences which are provided with points or barbs; and it consists in a novel arrangement and construction of the barbs and the fence-wire, by which the barb is able to turn in the direction of the length of the fence and thus may be prevented from injuring animals which may press against it, while it returns to its position transverse to the fence when the pressure upon it is removed.

My improved fence consists of separate links, A B C, D E F, J K L, M N O, made of wire and bent upon themselves to furnish loops A C, D F, J L, M O, at their ends. The extremities of the wires of the links are secured together by bending, so that the links will not be pulled apart by any unusual strain upon them. To further strengthen the links, they may be twisted upon themselves, as shown in Fig. 1. Between the links, and serving to unite them, I place barbs G, of diamond shape, made of sheet metal, and these barbs are pierced midway their length by an elongated hole, H, of sufficient size to receive two wires of the fence-links, and to hold them so loosely that the barb G may be turned aside, as shown in Figs. 2 and 4, its points being turned into the loops formed by the extremities of the links.

In turning the barb, as above described, the adjacent links will be drawn more closely together, and upon releasing the barb the lengthwise strain of the fence wire will cause the barb to return to its transverse position.

Having thus described my invention, what I claim as new, and desire to secure by Letters Patent, is—

The combination, with the rhombic barb G, provided with a transverse elongated central slot, H, of the closed wire links engaging the slots, whereby the barbs may be turned aside, and when released may resume their transverse position by the lengthwise strain upon the frame.

PETER C. FREESE.

Witnesses:
 FREDERICK I. ALLEN,
 GEORGE UNDERWOOD.